United States Patent [19]
Himuro

[11] Patent Number: 5,158,626
[45] Date of Patent: Oct. 27, 1992

[54] PNEUMATIC RADIAL TIRES

[75] Inventor: Yasuo Himuro, Kodaira, Japan

[73] Assignee: Bridgestone Corporation, Tokyo, Japan

[21] Appl. No.: 675,002

[22] Filed: Mar. 26, 1991

[30] Foreign Application Priority Data

Mar. 28, 1990 [JP] Japan .................................. 2-77004

[51] Int. Cl.$^5$ ...................... B60C 11/04; B60C 11/11
[52] U.S. Cl. ............................................. 152/209 R
[58] Field of Search .......... 152/209 R, 209 A, 209 D; D12/141-143, 146-149

[56] References Cited

U.S. PATENT DOCUMENTS

| | | | |
|---|---|---|---|
| D. 177,655 | 5/1956 | Wolfer | 152/209 D |
| D. 182,913 | 5/1958 | Marick et al. | 152/209 D |
| D. 314,538 | 2/1991 | Martin | D12/147 |
| 4,641,696 | 2/1987 | Semin et al. | 152/209 R |
| 4,796,683 | 1/1989 | Kawabata et al. | 152/209 R |
| 4,840,211 | 6/1989 | Makino | 152/209 R |

FOREIGN PATENT DOCUMENTS

| | | | |
|---|---|---|---|
| 0169305 | 9/1985 | Japan | 152/209 D |
| 0204805 | 8/1989 | Japan | 152/209 R |
| 0041909 | 2/1990 | Japan | 152/209 D |

Primary Examiner—Michael W. Ball
Assistant Examiner—Nancy T. Krawczyk
Attorney, Agent, or Firm—Sughrue, Mion, Zinn, Macpeak & Seas

[57] ABSTRACT

A pneumatic radial tire comprises at least one circumferential groove extending circumferentially of the tire at at least one end portion in widthwise direction of a tread and plural slant grooves arranged at an approximately equal interval in the circumferential direction of the tire and each extending diagonally across the circumferential groove. In this tire, a groove wall of the circumferential groove facing to a side of the tread end is extended straight in the circumferential direction and the other groove wall thereof is extended in a given sawtoothed shape in the circumferential direction of the tire.

6 Claims, 6 Drawing Sheets

FIG_1a

FIG_1b

FIG.2

FIG_3

FIG_4
PRIOR ART

FIG_5a
*PRIOR ART*

FIG_5b
*PRIOR ART*

PNEUMATIC RADIAL TIRES

BACKGROUND OF THE INVENTION

1. Field of the Invention

This invention relates to a pneumatic radial tire requiring high running performance or simultaneously satisfying dry and wet running performance on a circuit course or the like.

2. Related Art Statement

Figure 4:
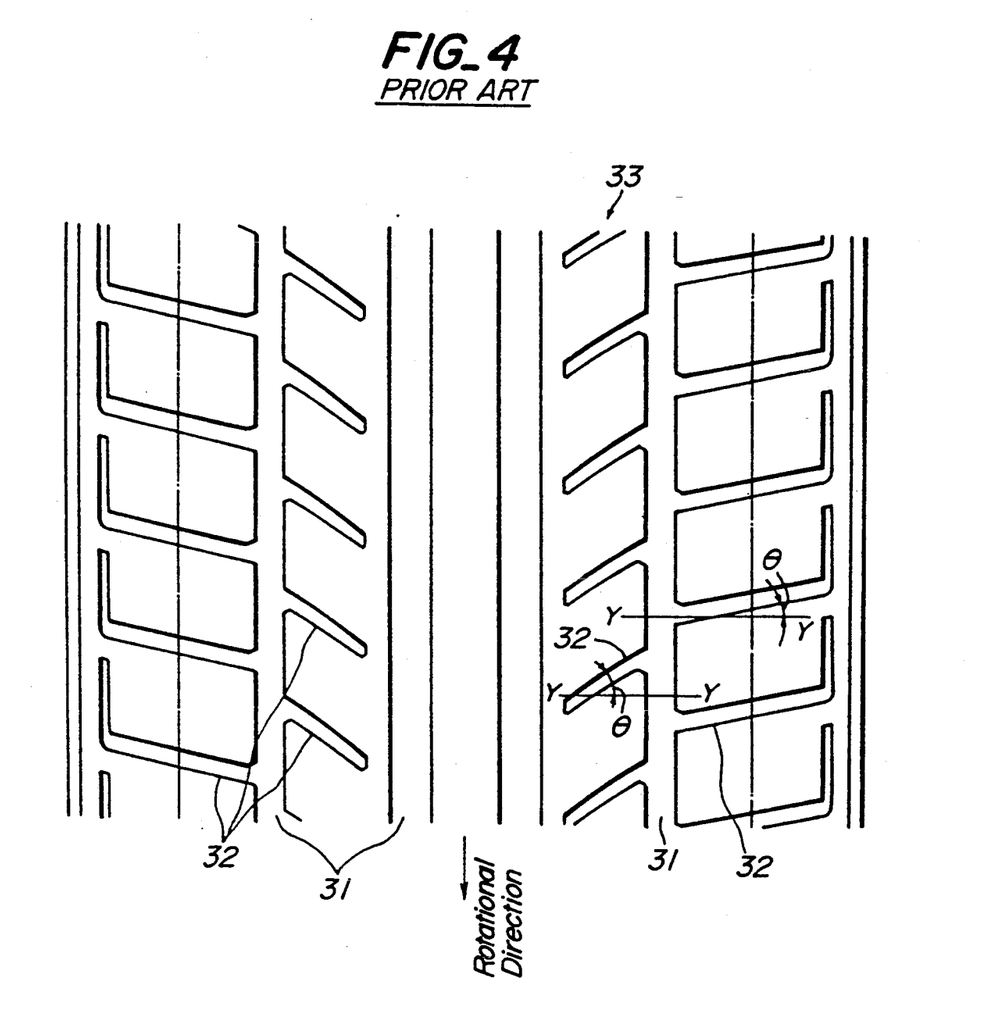
FIG. 4 is a schematic view showing the conventional tread pattern.

As shown in FIG. 4, the conventional tire having high running performance has a so-called unidirectional tread pattern comprising a combination of plural circumferential straight grooves 31 (four grooves in the illustrated embodiment) and slant grooves 32 slantly extending across the circumferential straight groove 31 located in the side end portion of the tread and approaching a lower end viewed at a posture mounted onto a vehicle to the central portion of the tread toward the rotational direction of the tire. An inclination angle $\theta$ of each of the slant grooves 32 with respect to a meridional line Y—Y of the tire becomes larger at the side of the central portion of the tread. Such a tire can develop excellent wet running performance based on the four circumferential straight grooves 31 and slant grooves 32.

When this tire is used on a circuit course or the like for sport running, a tread side region of the tire located outward the vehicle at the mounted state, for example, a right half region of the tire shown in FIG. 4 is particularly subjected to a large reaction force from road surface in the turning of the vehicle.

Figure 5A:
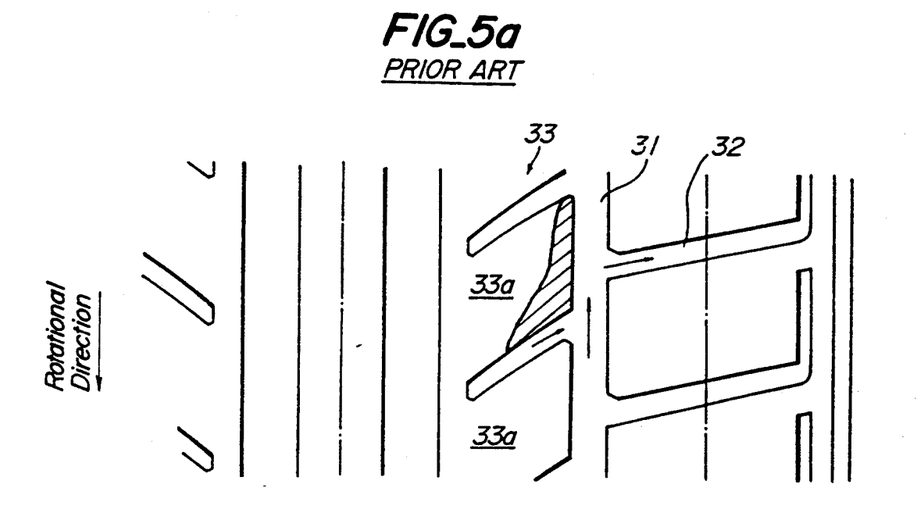
FIGS. 5a and 5b are schematic views the worn state and draining state in the conventional tread pattern and the comparative tread pattern, respectively.

As a result, each of island units 33a defined by the circumferential straight groove 31 and two slant grooves 32 and constituting a rib 33 located from the circumferential straight groove 31 toward the central portion of the tread largely wears at a side toward the tread side portion as shown by a shadowed region in FIG. 5a. In this case, the worn region and its worn depth become large at the stepping-in side of the island unit 33a, which tends to become vigorous as the angle $\theta$ of the slant groove 32 with respect to the meridional line Y—Y of the tire becomes large for the purpose of improving the wet performance of the tire. According to such a conventional tire, therefore, the effective ground contacting area of the rib 33 is lowered to bring about the poor ground contacting and the like, and hence the steering stability is undesirably and considerably lowered.

Figure 5B:
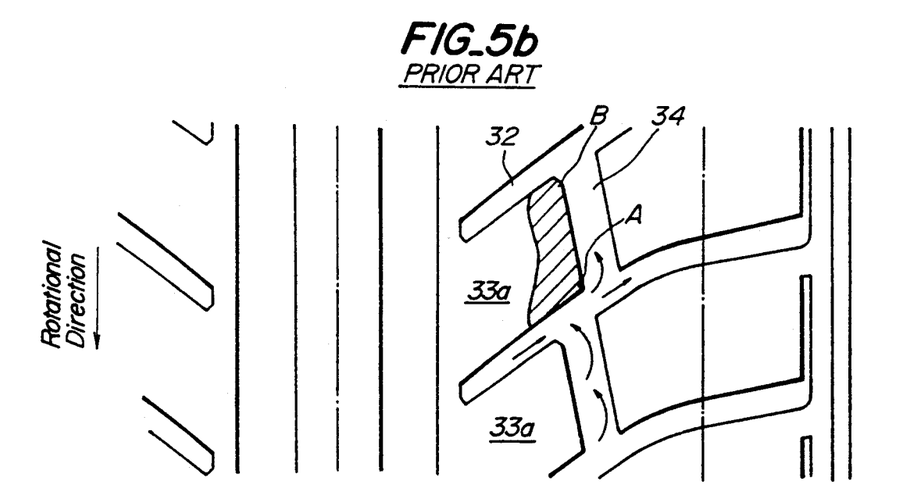

In order to reduce the worn amount of the island unit 33a at the step-in side, there is proposed a technique that a sawtooth zigzag groove 34 is arranged at the side portion of the tread instead of the circumferential straight groove 31 while maintaining the angle of the slant groove 32 with respect to the meridional line of the tire at a required value to make a difference between angles of corners at stepping-in side A and kicking-out side B of the island unit 33a small as shown in FIG. 5b. In this case, the difference in the wearing degree between the stepping-in side and the kicking-out side of the island unit 33a is advantageously reduced as shown by shadowed region in FIG. 5b.

According to this technique, however, the drainage performance through the sawtoothed zigzag groove 34 becomes smaller than that of the conventional circumferential straight groove 31, and consequently the wet running performance of the tire are undesirably lowered to cause a fear of generating hydroplaining phenomenon.

SUMMARY OF THE INVENTION

It is, therefore, an object of the invention to sufficiently solve the aforementioned problems and to provide a pneumatic radial tire capable of simultaneously establishing dry running performance and wet running performance at a higher level.

According to the invention, there is the provision of a pneumatic radial tire comprising at least one circumferential groove extending circumferentially of the tire at at least one end portion of a tread in widthwise direction of the tread and plural slant grooves arranged at an approximately equal interval in the circumferential direction of the tire and each extending diagonally across the circumferential groove, characterized in that a groove wall of the circumferential groove facing to a side of the tread end is extended straight in the circumferential direction and the other groove wall thereof is extended sawtoothedly in the circumferential direction of the tire, and that a linear segment of the sawtoothed groove wall extending between the adjoining slant grooves is inclined in a direction of approaching an upper end viewed at a posture mounted onto a vehicle to a central portion of the tread and the slant groove is extended in a direction of approaching a lower end at the mounted posture to the central portion of the tread toward the rotational direction of the tire.

BRIEF DESCRIPTION OF THE DRAWINGS

The invention will be described with reference to the accompanying drawings, wherein:

FIG. 1b is a schematic view showing the worn state and draining state in the tire shown in FIG. 1a;

DESCRIPTION OF THE PREFERRED EMBODIMENTS

The invention will be described in detail with reference to FIG. 1a.

Figure 1A:
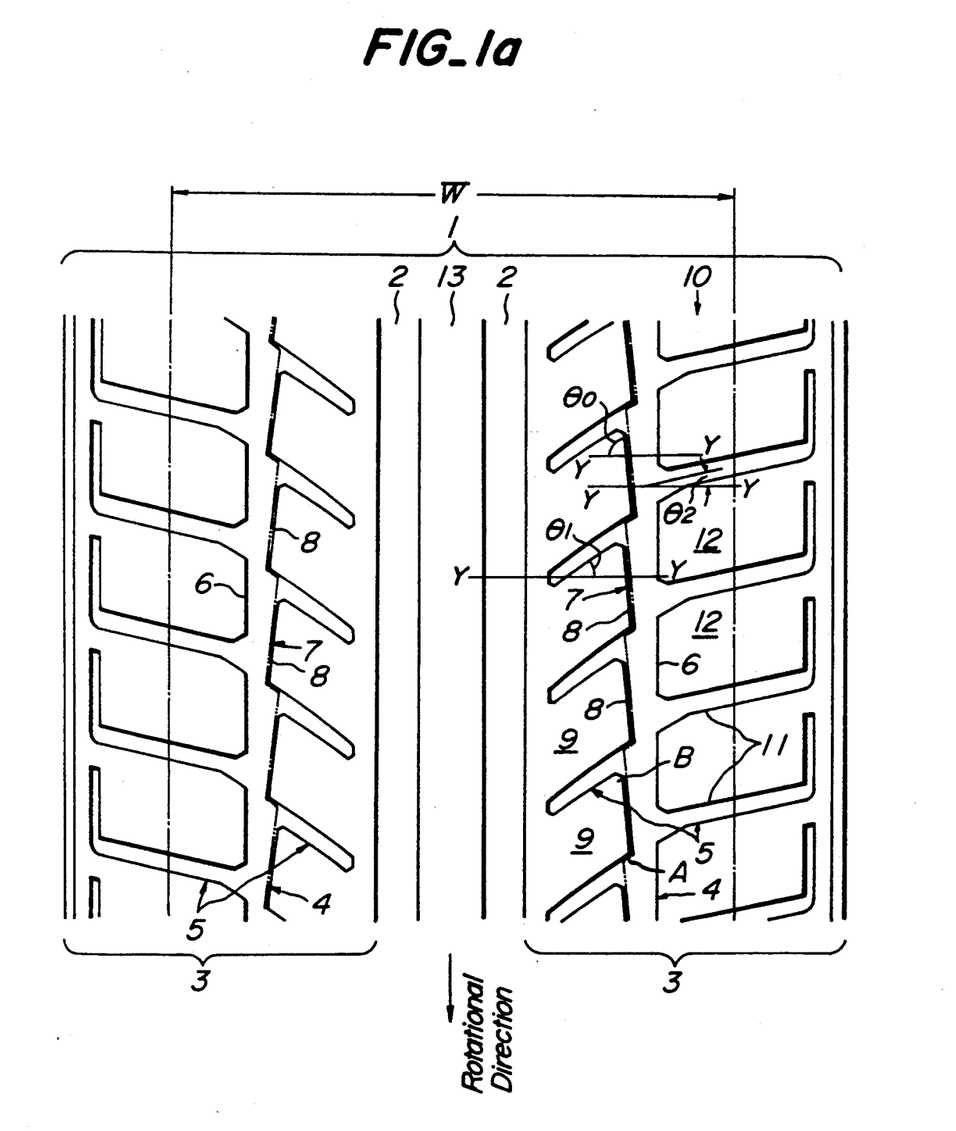
FIG. 1a is a schematic view showing a first embodiment of the tread pattern in the tire according to the invention.

According to the invention, as shown in FIG. 1a, two circumferential straight grooves 2 extending circumferentially of a tire are arranged in a central portion of a tread 1, while a circumferential groove 4 extending circumferentially of the tire is arranged in each of end portions 3 of the tread. Furthermore, plural slant grooves extending diagonally across the circumferential groove 4 are arranged in the end portion 3 at approximately equal interval in the circumferential direction of the tire. In this tire, a groove wall 6 of the circumferential groove 4 on the tread end side is extended straight in the circumferential direction of the tire and the other groove wall 7 on the central portion side of the tire is extended substantially sawtoothedly in the circumferential direction of the tire. Furthermore, a linear segment 8 of the sawtoothed groove wall 7 extending between the adjoining slant grooves 5 is inclined in a direction of approaching the upper end viewed at the posture mounted onto a vehicle to the central portion of the tread and each of the slant grooves 5 is inclined in a direction of approaching the lower end viewed at the mounted posture to the central portion of the tire toward the rotational direction of the tire.

In such a radial tire, since the groove wall 6 of the circumferential groove 4 facing to the tread end is extended straight in the circumferential direction of the tire, the flow of drain toward the front side of the vehicle is smoothened during the running on wet road surface, whereby the occurrence of hydroplaining phenomenon can effectively be prevented.

Figure 1B:
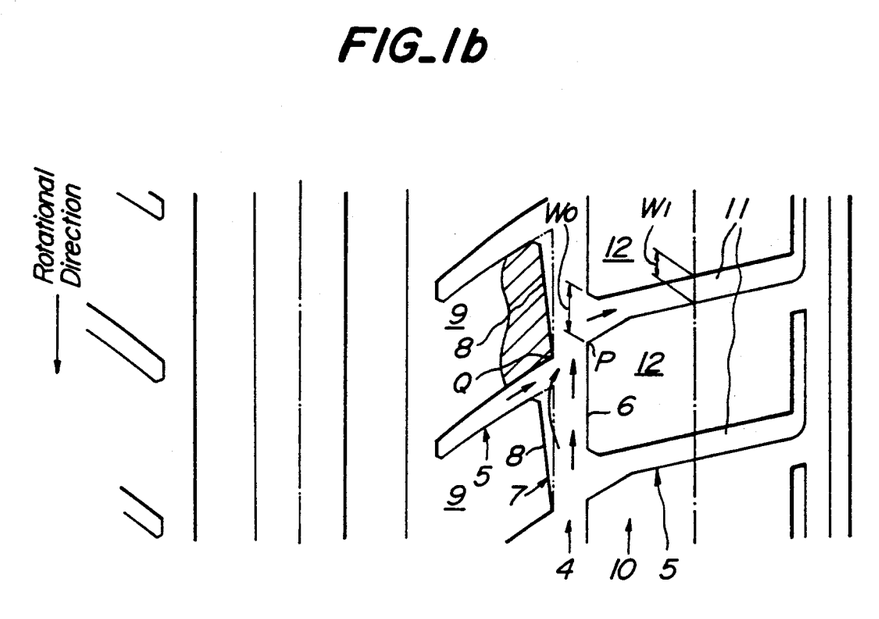

Since the drain flowing while running on a wet road has fundamentally a tendency of directing to a lower ground contacting pressure or going toward the rotational direction of the tire and toward the side of the tread, when the circumferential groove is a straight groove as shown in FIG. 5a, the draining toward the front side of the vehicle is very smoothly carried out. When the circumferential groove is a sawtoothedly zigzag groove as shown in FIG. 5b, the draining toward the front side is obstructed by the collision of draining water against the groove wall of the zigzag groove at the side of the tread end and hence it is obliged to direct the draining water toward the central portion of the tread having a high ground contacting pressure. On the other hand, according to the invention, the groove wall 6 on to the side of the tread end is extended straight in the circumferential direction of the tire, which serves to effectively guide the draining water toward the front side of the vehicle, so that the draining can sufficiently and smoothly be conducted as shown in FIG. 1b.

In this tire, the groove wall 7 of the circumferential groove 4 on the central portion side of the tread is extended substantially sawtoothedly in the circumferential direction of the tire. The linear segment 8 of the sawtoothed groove wall extending between the adjoining two slant grooves is inclined so as to approach the upper end viewed at the mounted posture onto the vehicle toward the central portion of the tread, so that the difference between angle of stepping-in side corner A and angle of kicking-out side corner B in an island unit 9 defined by the circumferential groove 4 and two slant grooves 5 is made sufficiently small. Consequently, the wearing degrees of the corners A and B are approximately equalized as shown by shadowed region in FIG. 1b, whereby the steering stability on dry road surface can advantageously be improved.

Thus, in the tires according to the invention, the dry running performance and the wet running performance can sufficiently be established under an influence of the circumferential groove 4.

The tread pattern shown in FIG. 1a is a first embodiment of the invention.

Moreover, the internal structure of the tire shown in FIG. 1a is the same as in the conventionally known radial tire, so that it is omitted for convenience' sake.

In this illustrated embodiment, the tire has a tire size of 205/60 R15, a ground contacting width W of tread 1 of 160 mm and a negative ratio of 38%. Furthermore, two circumferential straight grooves 2 having a groove width of 12 mm are extended straight in the central portion of the tread 1 in the circumferential direction of the tire, while one circumferential groove 4 is extended at each of the tread end portions 3 in the circumferential direction of the tire and plural slant grooves 5 extending diagonally across the circumferential groove 4 are arranged at an approximately equal interval in the circumferential direction of the tire. In this case, the groove wall 6 of the circumferential groove 4 or to the side of the tread end is extended straight in the circumferential direction of the tire and the other groove wall 7 is extended substantially sawtoothedly in the circumferential direction of the tire. The linear segment 8 of the sawtoothed groove wall 7 extending between the two adjoining slant grooves is inclined in a direction of approaching the upper end viewed at the mounted posture onto the vehicle toward the central portion of the tread. In such a circumferential groove 4, the groove width of a wider portion is 9 mm, and the groove width of a narrower portion is 7 mm, and an inclination angle $\theta_0$ of the linear segment 8 in the sawtoothed groove wall 7 with respect to the meridional line Y—Y of the tire is 84°.

In the illustrated embodiment, each of the slant grooves 5 is inclined in a direction of approaching the lower end viewed at the mounted posture onto the vehicle toward the central portion of the tread, in which the inclination angle $\theta_1$ of a portion of the slant groove 5 facing to the central portion of the tread is 40° with respect to the meridional line Y—Y and the inclination angle $\theta_2$ of a portion of the slant groove facing to the tread end is 10° with respect to the meridional line Y—Y.

According to the tire having such a tread pattern, the excellent drainage property can be produced by the actions of the slant grooves 5 and two circumferential straight grooves 2 as mentioned above. Also, the drainage property can further be improved by the action of the groove wall 6 of the circumferential groove 4 on to the side of the tread end as mentioned above to increase the high wet running performance.

In order to further improve the drainage property by the slant groove 5, as enlargedly shown in FIG. 1b, a portion 11 of the slant groove contributing to the formation of a row 10 comprised of shoulder blocks is preferable to have a structure that an opening width $W_0$ of the groove portion 11 to the circumferential groove 4 is within a range of 1.5-3 times of a groove width $W_1$ at substantially a center in the longitudinal direction of the groove portion 11. The flow of draining water from the circumferential groove 4 into the groove portion 11 can be facilitated. Furthermore, it is favorable that a position P of a kicking-out end of a block 12 in the shoulder block row 10 adjoining to the circumferential groove 4 is made substantially the same as in a position Q of a stepping-in end of the island unit 9 adjoining to the kicking-out end position P through the circumferential groove 4 in the circumferential direction of the tire. The flowing of water drained from a groove portion between the island units toward the groove portion 11 can further be enhanced without increasing pattern noise.

Moreover, the groove wall of the circumferential groove 4 facing to the side of the central portion of the tread is not necessarily required to have a sawtooth shape as a whole in the depthwise direction of the groove. As far as the worn state of the island unit can effectively be improved by rendering the groove wall 7 into a given sawtooth shape, the bottom of the groove wall 7 can be extended straight in the circumferential direction of the tire as shown, for example, by phantom line in FIG. 1b, whereby the rigidity of the island unit 9 can be increased as compared with the case that the groove wall 7 can be sawtooth as a whole in the depthwise direction.

In the tire of FIG. 1, the inclination angle $\theta_0$ of the linear segment 8 in the sawtooth groove wall 7 is within a range of not less than 70° but less than 90°, preferably 80°-85° with respect to the meridional line Y—Y. When the inclination angle $\theta_0$ is less than 70°, the drainage property per constant groove volume is degraded and also the effect of improving the worn state of the island unit 9 becomes less to enlarge damaging of stepping-in corner in the island unit 9. When it exceeds 90°, the worn state can not be improved to a satisfactory level.

In such a tire, the inclination angle of the groove wall 6 of the circumferential groove 4 with respect to a normal line of the tire drawn from the tread surface at the position corresponding to the groove wall 6 can be made larger in an outer portion in the radial direction than in an inner portion in the radial direction, whereby the falling down of the blocks 12 in the shoulder block row 10 toward the central portion of the tread can effectively be prevented in the turnin of the vehicle and hence the occurrence of uneven wear in the island unit 9 can be prevented to prevent the degradation of the steering stability.

Figure 2:
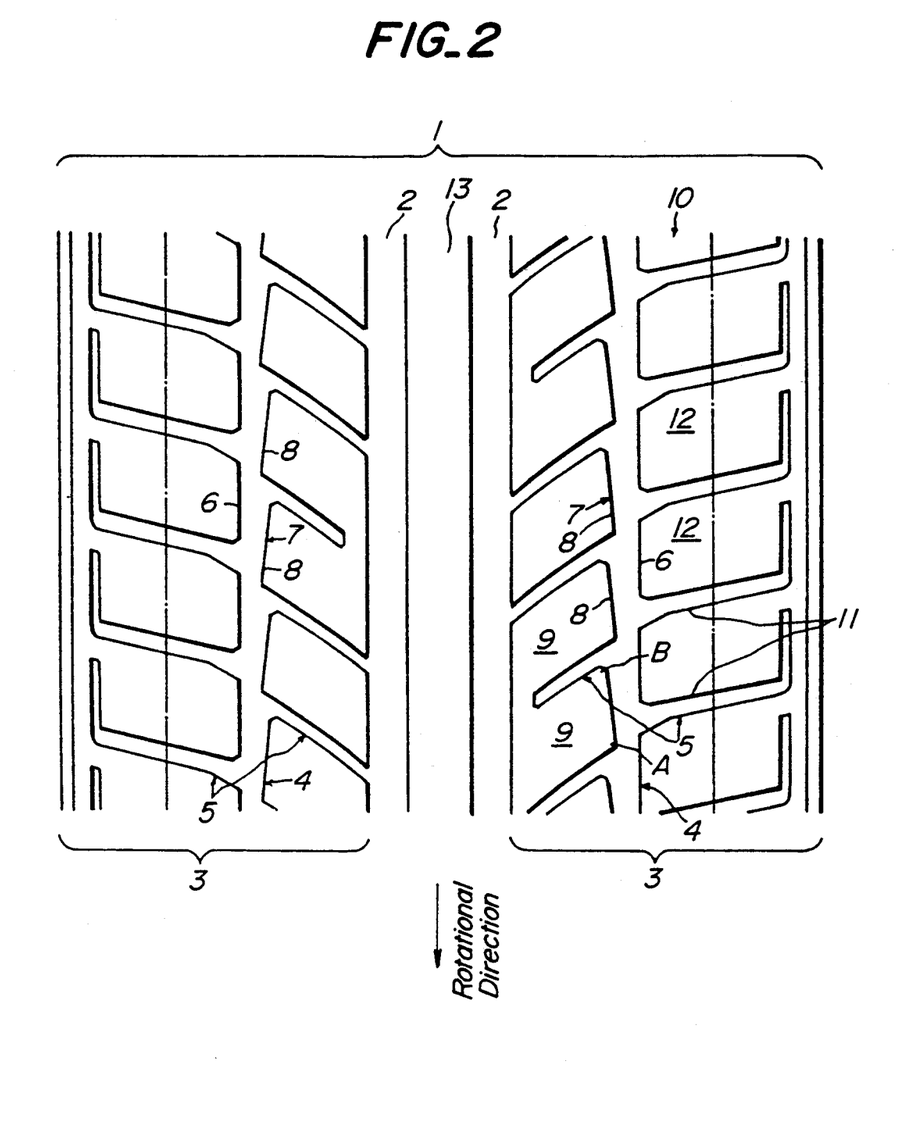
FIGS. 2 and 3 are schematic views showing another embodiments of the tread pattern according to the invention, respectively.

FIG. 2 shows a second preferred embodiment of the tread pattern in the tire having a tire size of 205/60 R15 according to the invention. In this case, the plural slant grooves 5 are principally arranged so as to communicate with the respective circumferential straight groove 2, in which a slant groove 5 located every three slant grooves in the circumferential direction is terminated in the island unit 9 before the circumferential straight groove 2.

According to this embodiment, the draining of water from the circumferential straight groove 2 toward the slant groove 5 is made possible, so that the drainage property is further improved as compared with the above first embodiment.

In these embodiments, when the inclination angle of the groove wall of the circumferential straight groove 2 or the tread end with respect to a normal line drawn from the tread surface at a position corresponding to the groove wall is made larger than that of a groove wall on the side of the central portion of the tread, the rigidity in widthwise direction of the island unit 9 adjacent to the circumferential straight groove 2 and on the tread end is increased to prevent the occurrence of uneven wear of a center rib 13 due to the falling down of the island unit 9. Hence, the degradation of the steering stability can be prevented.

Figure 3:
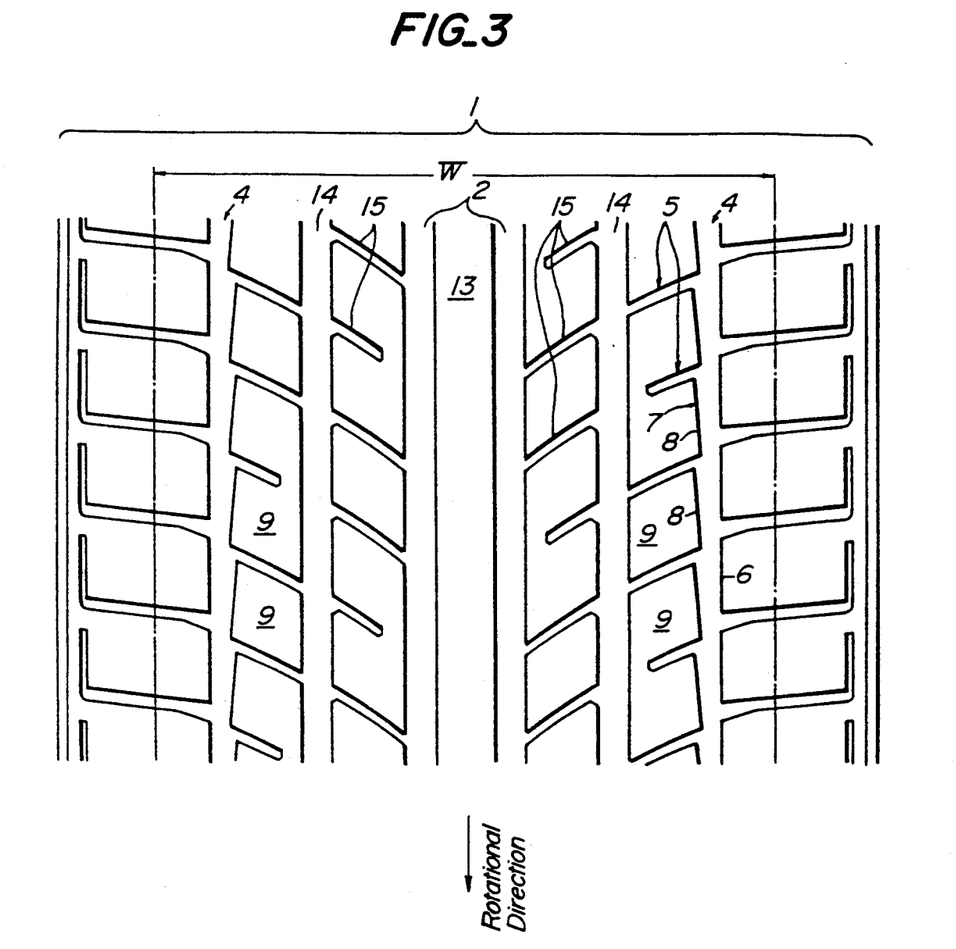

FIG. 3 shows a third preferred embodiment of the tread pattern of the tire having a wide tread width and a tire size of 295/35 R18 according to the invention. This tire has a ground contacting width of 240 mm and a negative ratio of 40%. In the illustrated embodiment, the circumferential straight groove 2 and another circumferential straight groove 14 arranged between the circumferential straight groove 2. The circumferential groove 4 have a groove width of 12.5 mm, while the width of the circumferential groove 4 and the inclination angle of the linear segment 8 of the sawtooth groove wall 7 are the same as in the aforementioned embodiments. The slant grooves 5 are arranged in the same manner as in the embodiment of FIG. 2, while plural slant grooves 15 are principally arranged between the circumferential straight grooves 2 and 14 to communicate with the slant grooves 5 in the same manner as in the embodiment of FIG. 2. In this case, the slant grooves 15 are opened at both ends to the circumferential straight grooves 2 and 14 except that the slant groove 15 located every three slant grooves in the circumferential direction is terminated before the circumferential straight groove 2. In other words, one of the two adjoining slant grooves 5 opening at both ends to the circumferential straight groove 14 and the circumferential groove 4 is continuous with the slant groove 15 opening at both ends to the circumferential straight grooves 2 and 14, while the other slant groove 5 communicates with the slant groove 15 terminating before the circumferential straight groove 2.

According to this third embodiment, satisfactory drainage property can be given to tires having a wider tread width.

In this third embodiment, it is preferable that the inclination angle of the groove wall of the circumferential straight groove 14 facing to the side of the tread end with respect to a normal line drawn from the tread surface at a position corresponding to the groove wall is larger at an outer portion in radial direction than in an inner portion in the radial direction, whereby the rigidity in widthwise direction of the island unit 9 defined between the circumferential straight groove 14. The circumferential groove 4 can be increased to effectively prevent the falling down of the island unit toward the central portion of the tread in turning of the vehicle.

A comparison test between the tire according to the invention and the conventional tire will be described with respect to the steering stability and resistance to uneven wear on dry road surface and the drainage property on wet road surface.

| [Test tires] | |
|---|---|
| Invention tire I: | tire shown in FIG. 1a |
| Invention tire II: | tire shown in FIG. 2 |
| Conventional tire: | tire shown in FIG. 4, which is substantially the same as in the tire of FIG. 1a except that the groove width of the circumferential straight groove located at the side of the tread end is 8 mm and the groove volume thereof is equal to that of the circumferential groove 4 shown in FIG. 1a. |

Test method

The steering stability on dry road surface was evaluated by a feeling of a professional driver when the tire was run on a dry circuit course under normal conditions defined according to Japanese Industrial Standard. The resistance to uneven wear was evaluated by visually observing the worn state of the tread surface after the above evaluation of the steering stability. The drainage property was evaluated by measuring an area actually contacting the ground when the tire was run at a speed of 80 km/h on wet road having a water depth of 5 mm.

Test results

The thus measured results are shown by an index in Table 1 on the basis that the conventional tire is 100. Moreover, the larger the index value, the better the result.

TABLE 1

| | Conventional tire | Invention tire I | Invention tire II |
|---|---|---|---|
| Steering stability | 100 | 110 | 105 |
| Resistance to uneven wear | 100 | 130 | 125 |

TABLE 1-continued

|  | Conventional tire | Invention tire I | Invention tire II |
| --- | --- | --- | --- |
| Drainage property | 100 | 100 | 105 |

As seen from Table 1, the tires according to the invention develop the excellent drainage property and also the resistance to uneven wear can considerably be developed as compared with the conventional tire, and consequently the steering stability can effectively be improved.

As mentioned above, according to the invention, at least one circumferential groove is arranged at at least one end portion in widthwise direction of the tread to extend circumferentially of the tire, in which the groove wall of the circumferential groove facing to the side of the tread end is extended straight in the circumferential direction of the tire and the other groove wall facing to the central portion of the tread is extended substantially sawtoothedly in the circumferential direction of the tire and the linear segment of the sawtoothed groove wall extending between the adjoining slant grooves is inclined in a direction of approaching the upper end viewed from a posture mounted onto a vehicle toward the central portion of the tread in the rotational direction, whereby the degradation of the drainage property in the tire can sufficiently be prevented and also the worn states at the stepping-in side and the kicking-out side of the island unit adjacent to the sawtooth groove wall can substantially be equalized to sufficiently improve the steering stability on dry road surface.

What is claimed is:

1. A unidirectional pneumatic radial tire comprising; at least one circumferential groove extending circumferentially of the tire at at least one end portion in a widthwise direction of a tread, plural slant grooves arranged at an approximately equal interval in the circumferential direction of the tire, each of said slant grooves extending diagonally across the circumferential groove, wherein the groove wall furthest from the center plane of the tire of of said circumferential groove is extended straight in the circumferential direction and the other groove wall thereof is extended in a sawtooth in the circumferential direction of the tire, a linear segment of the sawtooth groove wall extending between the adjoining slant grooves is inclined with respect to a circumferential line and opening in a direction opposite the preferred rotational direction of said tire and, the slant groove is extended in a direction opposite to that of said linear segment with respect to the preferred rotational direction of the tire.

2. The pneumatic radial tire according to claim 1, wherein said linear segment of said sawtooth groove wall extending between said adjoining slant grooves has an inclination angle of not less than 70° but less than 90° with respect to a meridional line of the tire.

3. The pneumatic radial tire according to claim 1, wherein said slant groove located at a shoulder portion of said tread has a structure that a width opening to said circumferential groove is within a range of 1.5-3 times of a groove width of a central portion in longitudinal direction of said slant groove.

4. The pneumatic radial tire according to claim 1, wherein a position of a kicking-out end of a block defined in a shoulder portion by said slant groove and adjacent to said circumferential groove is substantially the same level as a position of a stepping-in end of an island unit defined by said circumferential groove and said slant grooves and adjacent to the position of the kicking-out end through said circumferential groove in the circumferential direction of the tire.

5. The pneumatic radial tire according to claim 1, wherein a bottom edge of said sawtooth groove wall is extended straight in the circumferential direction of the tire.

6. The pneumatic radial tire according to claim 1, wherein said groove wall of said circumferential groove facing to the side of said tread end has a structure that an inclination angle of an outer portion in radial direction of said groove with respect to a normal line drawn from a surface of said tread at a position corresponding to said groove wall is larger than that of an inner portion in radial direction of said groove.

* * * * *